United States Patent [19]

Halvorsen

[11] 4,244,530
[45] Jan. 13, 1981

[54] INTEGRATED COAL CLEANING AND SLURRY PREPARATION PROCESS

[75] Inventor: William J. Halvorsen, Pittsburgh, Pa.

[73] Assignee: Consolidation Coal Company, Pittsburgh, Pa.

[21] Appl. No.: 104,322

[22] Filed: Dec. 17, 1979

[51] Int. Cl.³ ............................................. B02C 23/08
[52] U.S. Cl. ...................................... 241/24; 209/10; 209/12; 209/156
[58] Field of Search ........................ 209/10, 12, 13, 17, 209/18, 156; 241/24

[56] References Cited

U.S. PATENT DOCUMENTS

| | | | |
|---|---|---|---|
| 2,330,470 | 9/1943 | Erickson | 209/12 X |
| 2,656,118 | 10/1953 | Chelminski | 209/10 X |
| 3,168,350 | 2/1965 | Phinney et al. | 44/51 X |
| 3,672,512 | 6/1972 | Werner | 210/523 |
| 3,908,912 | 9/1975 | Irons et al. | 241/24 X |
| 4,133,747 | 1/1979 | Visman | 209/10 |

Primary Examiner—William A. Cuchlinski, Jr.
Attorney, Agent, or Firm—F. Lindsey Scott; William A. Mikesell, Jr.

[57] ABSTRACT

A process is disclosed for producing a coal slurry from a raw coal feedstock which contains coal and gangues. The process optimizes coal recovery, coal quality and the hydraulic characteristics of the pipeline slurry.

8 Claims, 1 Drawing Figure

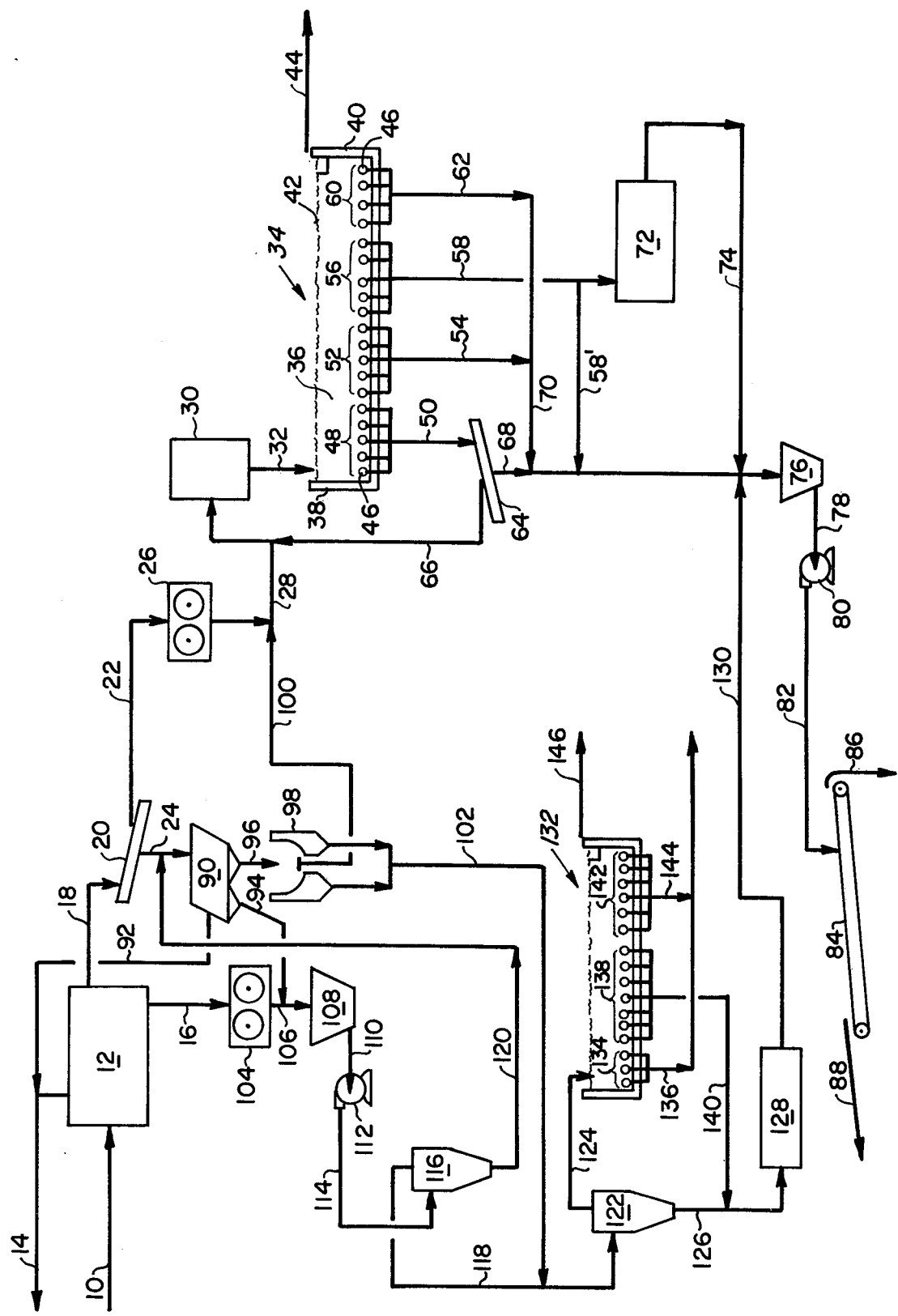

INTEGRATED COAL CLEANING AND SLURRY PREPARATION PROCESS

This invention relates to the cleaning of coal.

This invention further relates to the preparation of pipeline slurries.

This invention further relates to an integrated process for cleaning a raw coal feedstock containing coal and gangues and producing an aqueous coal slurry having a controlled particle size distribution and concentration.

In the use of coal as a fuel, a continuing problem is the cleaning and transportation of coal. Coal cleaning is of considerably more importance when the coal must be transported over long distances since the transportation of inorganic materials which form ash upon combustion of the coal and the like is expensive and undesirable. As a result, coal as produced from the mine is normally cleaned by a variety of techniques prior to transportation to use as a fuel.

One method for transporting coal is the use of coal slurry pipelines for the transportation of aqueous coal slurries. The transportation of such slurries is well known and it is desirable in the use of such aqueous slurries that the coal be cleaned to reduce the ash content of the coal prior to transporting the coal in the form of an aqueous slurry. Further, it has been found that when the coal has a controlled particle size distribution as shown for instance in U.S. Pat. No. 3,168,350 issued Feb. 2, 1965 to Phinney, et al. that a lower energy input is required for the transportation of the coal. The coal size distribution required to achieve the lower energy requirements is different than the "normal size distribution" which refers to the size distribution of comminuted coal particles following a statistical distribution by weight according to a conventional distribution curve. The improved results are accomplished by the use of aqueous coal slurries which have a reduced amount of material appearing in the size consist range between about 100 Tyler mesh and about 325 Tyler mesh with an increased amount of material having a size consist smaller than about 325 Tyler mesh. Clearly, the production of such a slurry can be accomplished by a variety of means as disclosed in U.S. Pat. No. 3,168,350. One method disclosed in the patent is the mixing of two slurries, one containing larger particulate coal and the other containing the more finely divided coal.

It has now been found that a coal feedstock containing coal and gangues can be readily treated by the process described hereinafter to clean the coal and concurrently produce an aqueous coal slurry having the desired size distribution to permit the higher efficiency transportation of the aqueous coal slurry via a pipeline.

The FIGURE is a schematic diagram of an embodiment of the process of the present invention.

In the discussion of the FIGURE the various process streams are referred to as lines although in some instances conveyor belts etc. may be used.

A run-of-mine coal stream containing coal and gangues is charged via a line 10 to a separator device 12, such as a coal jig vessel where the run-of-mine coal is separated into a gangues stream discarded through a line 14, a coal stream recovered through a line 18 and a middlings stream recovered through a line 16. The coal stream recovered through line 18 is passed to a screen 20 where it is separated into a coarse coal stream recovered through a line 22 with the coarse coal stream recovered through line 22 having a size consist greater than a selected minimum and a second coal stream recovered through a line 24 with the coal stream recovered through line 24 having a size consist less than the selected minimum. A commonly used screen size, i.e. selected minimum, is about ¼ inch, so that the stream flowing through line 22 is of a size consist greater than about ¼ inch with the stream flowing through line 24 being of a size consist less than about ¼ inch. The reference to a screen size of ¼ inch contemplates a screen having openings which are square, circular or the like having a diameter in the case of a circular opening of roughly ¼ inch or sides of ¼ inch in the event of a square opening etc. The coal stream flowing through line 22 is a relatively coarse stream and typically might contain coal particles having at least one dimension of up to 6 inches. Optionally, a heavy media bath (not shown) could be used to separate additional inorganic materials from said coarse coal in line 22 with the separated inorganic materials being passed to waste, etc. and the coarse coal being passed via line 22 to further processing. The coal stream in line 22 is passed to a crusher or a grinder 26 and ground to produce a coal stream having a particle size range less than about ¼ inch. The resulting crushed coal stream is recovered through a line 28 and passed via line 28 to another grinding device 30, such as a cage mill, where the coal stream flowing through line 28 is further reduced in size. Desirably the coal stream produced in grinder 30 is of a size consist smaller than about 14 Tyler mesh, in other words of a size consist of about 14 Tyler mesh by 0. Grinder 30 is desirably of a type adapted to grind larger particles present in the coal stream flowing through line 28 with minimal grinding of the finer particles in the stream flowing through line 28. One suitable device is a cage mill. One such cage mill is described as "The Gundlach Cage-Paktor" in *Coal Preparation*, editors Joseph W. Leonard and David R. Mitchell, Third Edition, American Institute of Mining, Metallurgy and Petroleum Engineers, Inc. New York, 1968, Page 7-27 through 7-28. While other types of grinders could be used, the use of cage mills is considered to be particularly desirable since as indicated, cage mills tend to grind the particles larger than about 14 Tyler mesh without substantially reducing the size of the particles already smaller than about 14 Tyler mesh in size. The resulting finely divided coal stream is recovered from grinder 30 through a line 32 and passed to a classification or separation device 34 which is shown as a hydrorake. Hydrorakes are described in a publication entitled "HYDRA A Unique Sludge Removal System," published by Barrett Haentjens & Co. of Pittsburgh and U.S. Pat. No. 3,672,512. While the use of hydrorakes is considered to be well known to the art, the operation of hydrorake 34 will be described in some detail. The stream of coal flowing through line 32 is mixed with water to produce an aqueous slurry of a desired concentration which is charged to a first end 38 of a basin 36. The aqueous slurry flows toward a second end 40 of basin 36 at at rate such that the coal solids settle to the bottom of basin 36 with clean water being recovered from second end 40 of hydrorake 34 via a line 44. As the coal solids settle to the bottom of basin 36 a size separation is effected. The size separation achieved is a function of both the size and the density of the individual coal particles. The larger coal particles are recovered from a first section 48 with slightly smaller coal particles being recovered from a second section 52, smaller particles being recovered from a third section 56 and still smaller particles being recovered from a fourth section 60. The smallest particles are recovered via a line 62 from fourth section 60 and are typically of a size consist less than about 325 Tyler mesh. The solids recovered from second zone 52 via a line 54 are typically larger than about 100 Tyler mesh, but smaller than 14 Tyler mesh. The stream of solids recovered from first zone 48 via a line 50 will contain substantial quantities of coal particles smaller than about 14 Tyler mesh but may also contain coal particles larger than about 14 Tyler mesh. Such larger particles are recovered at a screen 64 and recycled to grinder 30 via a line 66. The coal particles smaller than about 14 Tyler mesh are recovered as an underflow from screen 64 via a line 68. The coal particles recovered from third zone 56 are recovered via a line 58 and typically have a size consist from about 100 to about 325 Tyler mesh. This coal stream is passed to a grinder 72 where it is further ground to reduce the amount of 100 to 325 Tyler mesh particles which will ultimately be found in the aqueous coal slurry. The resulting finely divided coal from grinder 72 which is desirably a grinder such as a ball mill or the like is passed through a line 74 to mixture with a coal stream flowing through a line 70, with the coal stream flowing through line 70 representing a combination of the coal streams recovered via line 62, line 54 and line 68. The combined coal streams flowing through lines 70 and 74 are passed to a mixing cone 76 from which an aqueous coal slurry flows via a line 78 to a pump 80 then to a line 82 and optionally to a further coal cleaning device shown as a belt launderer 84. Belt launderer 84 effects a further separation of gangues recovered via a line 86 with the cleaned aqueous coal slurry being discharged to pipelining via a line 88. Belt launderers are known to those skilled in the art and are available commercially from the Denver Equipment Co., 1400 Seventeenth Street, Denver 17, Colorado as shown in their Bulletins No. LG3-B15 and C4B-B1. The hydraulic characteristics are maintained at a rate near the transition point from turbulent to laminar flow to thereby control the amount of heavier material deposited on the belt. This control is desirably effected by automatically changing the belt slope as a function of the slurry viscosity. The gangues stream recovered via line 86 may contain substantial quantities of coal and may optionally be recycled to the process for further treatment.

The operations described above relate to the processing of the coarse coal recovered from jig 12 via line 22.

Turning now to the undersized coal recovered via line 24 from screen 20 the undersized coal, i.e. of a size consist less than about ¼ inch is passed to a further separator 90 which is suitably a device such as a Deister table or the like where the coal flowing through line 24 is separated into a coal stream recovered through a line 96, a middlings stream recovered through a line 94 and a waste stream recovered through a line 92 and passed to waste. Coal stream 96 is passed to a separator device such as a sieve bend 98 where the coal stream is separated into a portion having a size consist greater than a desired minimum and a portion having a size consist less than the desired minimum. Typically the separation at sieve bend 98 is into a stream having a size consist from about ¼ inch to about 28 Tyler mesh with this stream being recovered through a line 100 and passed to processing with the coal stream flowing through line 28 and an undersized coal stream having a particle size typically less than about 28 Tyler mesh which is passed through a line 102 to further processing with the coal recovered from the middlings.

Turning now to the processing of the middlings recovered from jig 12 via line 16 and Deister table 90 via line 94 the middlings recovered from jig 12 which are typically of a size consist similar to that of the coal recovered through line 22 are passed to crushing in a crusher 104 where the middlings are crushed to a size consist less than about ¼ inch. The crushed middlings recovered through line 106 are combined with the middlings recovered from Deister table 90 via line 94 and passed to a mixing sump 108 where the middlings are mixed and passed via a line 110 to a pump 112 which discharges into a line 114 which passes the stream of middlings to a compound water cyclone 116. At cyclone 116 the middlings are cleaned so that a gangue stream is recovered as the cyclone underflow which is returned via a line 120 to Deister table 90 in order to remove any entrained coal. The cyclone overflow containing cleaned coal is passed via a line 118 to a second cyclone 122. The undersize coal flowing from sieve bend 98 via line 102 is combined with the cleaned middlings flowing through line 118. The combined streams are charged to a cyclone 122 and are separated to produce an underflow stream comprising primarily coal of a size consist from about ¼ inch to about 100 Tyler mesh which is recovered via a line 126 and an overflow stream which is recovered via a line 124 and passed to a second hydrorake 132 which operates in a similar fashion to hydrorake 34. In hydrorake 132 an aqueous stream is recovered via a line 146 with gangues and the like being recovered from a first zone 134 via a line 136 and from a third zone 142 via a line 144. The gangues recovered via line 144 are finely divided gangues and are passed to combination with the more coarsely divided gangues recovered through line 136 and to waste. A cleaned coal fraction is recovered from a middle section 138 and passed to combination with the stream flowing through line 126 via a line 140. The combined streams are then charged to a ball mill 128 or similar grinding device where the particle size of the solids stream is reduced to a size consist less than about 100 Tyler mesh with the particulate stream being passed to combination with the steams flowing through lines 70 and 74. The combined streams are treated as discussed previously.

The use of jigs, Deister tables, sieve bends, cyclones, ball mills and the like are considered to be well known to those skilled in the art. Cyclones in particular are discussed at some length in a publication entitled "Cyclones in Industry," edited by K. Rietema and C. G. Verver, Elsevier Publishing Company, 1961. Hydrorakes, cage mills, ball mills, screens and the like are also considered to be known to those skilled in the art. The particular novelty of the present process is considered to lie in the particular combination of operations to achieve the particularly desirable result. In other words by the use of the process of the present invention, coal is processed to produce an aqueous coal slurry having a size consist such that the slurry has a reduced energy requirement for its transportation via a pipeline. The composition of "the gapped size consist" is described, as indicated previously, in U.S. Pat. No. 3,168,350. The process also optimizes the coal recovery from the raw coal stream in that the middlings are reduced in size so that increased quantities of cleaned coal are recovered from the middlings stream for inclusion in the aqueous coal slurry. As a net result, the raw coal stream is treated to produce a finely divided aqueous coal slurry of a precisely controlled size consist while still optimizing the recovery of coal from the coal feedstream. Further, any higher specific gravity, i.e. inorganic particles in the product slurry are less than about 100 Tyler mesh.

In particular, the control of the amount of 100 by 325 Tyler mesh material in the coal slurry is effected by ball milling all or a portion of the coal stream flowing through line 58 from hydrorake 34. Optionally, only a portion of the stream flowing through line 58 is ground to reduce the quantity of 100 by 325 Tyler mesh material included in the slurry. In such an instance the portion of the stream flowing through line 58 which is not further ground is passed through a line 58' to line 70. Such allows precise control of the amount of 100 by 325 Tyler mesh material included in the aqueous coal slurry. Previously, a preferred method for producing such slurries was to overgrind a given coal stream for subsequent combination with a considerably coarser coal stream. By the process of the present invention, no such combination of streams is required, since the present process results in the production of a stream which may be readily adjusted to achieve the desired particle size distribution. Further, since the middlings are finely divided and thereafter subjected to further separations an increased quantity of cleaned coal is recovered. Since a substantial quantity of the sulfur contained in coal feedstreams is present as inorganic compounds such a process results in a substantial lowering of the sulfur content of the coal stream so produced over that of the coal feedstock.

Having thus described the invention by reference to its preferred embodiments, it is respectfully pointed out that the embodiment set forth is illustrative rather than limiting in nature and that many variations and modifications are possible within the scope of the present invention. For instance, a variety of separation devices is available to those skilled in the art for use as a substitute for many of the separation and grinding devices described in the embodiment set forth. As indicated previously the objective of the present invention is the production of a cleaned aqueous coal slurry having a controlled particle size distribution which is accomplished by the particular combination of steps set forth. Many such variations and modifications may appear obvious and desirable to those skilled in the art upon a review of the foregoing description of preferred embodiments.

Having thus described the invention, I claim:

1. A coal cleaning and slurry preparation process for producing an aqueous coal slurry having a controlled coal particle size distribution and concentration from a coal feedstream which contains coal and gangues, said process consisting essentially of:

(a) separating said coal feedstream into a first coal stream, a first coarse middlings stream and a first waste stream containing a portion of said gangues;
   (b) separating said first coal stream into a second coal stream, said second coal stream containing coarse coal having a particle size consist larger than a first selected minimum and a third coal stream, said third coal stream containing coal having a particle size consist smaller than said first selected minimum;
   (c) separating said third coal stream into a fourth coal stream, a second middlings stream and a second waste stream containing a portion of said gangues;
   (d) separating said fourth coal stream into a fifth coal stream, said fifth coal stream containing coal having a particle size consist larger than a second selected minimum and a sixth coal stream, said sixth coal stream having a particle size consist smaller than said second minimum;
   (e) crushing said coarse coal to produce a seventh coal stream;
   (f) combining said seventh coal stream and said fifth coal stream and grinding said coal to produce an eighth coal stream;
   (g) separating said eighth coal stream into a ninth coal stream, said ninth coal stream containing coal having a particle size consist smaller than about 325 Tyler mesh, a tenth coal stream, said tenth coal stream containing coal having a particle size consist greater than about 100 Tyler mesh and an eleventh coal stream, said eleventh coal stream containing coal having a paraticle size consist from about 325 to about 100 Tyler mesh;
   (h) separating at least a major portion of any coal particles larger than about 14 Tyler mesh from said tenth coal stream to produce a twelfth coal stream;
   (i) recycling said twelfth coal stream to combination with said fifth coal stream and said seventh coal stream;
   (j) grinding at least a portion of said eleventh coal stream to produce a thirteenth coal stream;
   (k) crushing said coarse middlings;
   (l) combining said crushed coarse middlings and said second middlings stream to produce a third middlings stream;
   (m) separating said third middlings stream into a third waste stream, said third waste stream containing small amounts of coal and middlings, and a fourth cleaned middlings stream, said fourth cleaned middlings stream containing cleaned coarse middlings and minus 100 mesh gangues and middlings;
   (n) recycling said third waste stream to combination with said third coal stream;
   (o) combining said fourth cleaned middlings stream and said sixth coal stream to produce a first combined stream;
   (p) separating said first combined stream into a second combined stream, said second combined stream containing particles of a size consist larger than a third selected minimum and a third combined stream, said third combined stream containing particles of a size consist smaller than said third selected minimum;
   (q) separating said third combined stream into a fourteenth coal stream and a fourth waste stream containing a portion of said gangues;
   (r) combining said fourteenth coal stream and said second combined stream and grinding the combined streams to produce a fifteenth coal stream, said fifteenth coal stream containing coal having a particle size consist smaller than about 100 Tyler mesh; and,
   (s) combining said ninth coal stream, said tenth coal stream, any portion of said eleventh coal stream not ground to produce said thirteenth coal stream, said thirteenth coal stream and said fifteenth coal stream to produce said aqueous slurry having a controlled coal particle size distribution.

2. The process of claim 1 wherein said first selected minimum is about ¼ inch.

3. The process of claim 2 wherein said second selected minimum is about 28 Tyler mesh.

4. The process of claim 3 wherein said third selected minimum is about 100 Tyler mesh.

5. The process of claim 1 wherein said aqueous coal slurry is further cleaned to remove additional gangues prior to long distance transportation of said aqueous coal slurry.

6. The process of claim 1 wherein said aqueous coal slurry contains less than a normal size distribution amount of coal particles of a size between about 325 and about 100 Tyler mesh.

7. The process of claim 1 wherein said aqueous coal slurry has a lower sulfur content than said coal feedstream.

8. The process of claim 1 wherein the higher specific gravity particles in said aqueous slurry are of a size less than about 100 Tyler Mesh and wherein the coarser particles are of a lower specific gravity.

* * * * *